UNITED STATES PATENT OFFICE 2,068,586

CYCLIC CYANO COMPOUNDS AND PROCESS OF PRODUCING SAME

Karl Ziegler, Heidelberg, Germany, assignor to Schering-Kahlbaum A. G., Berlin, Germany No Drawing. Application August 8, 1933, Serial No. 684,233. In Germany August 15, 1932

8 Claims. (Cl. 260—99.30)

My invention relates to organic cyano-compounds and more especially to cyclic cyanoketones and cyanoketimides, and to the process of producing such compounds.

As is well known to those skilled in the art, esters of dicarboxylic acids, when treated with alkali metals, will be condensed to form cyclic keto acid esters. In the case of esters of the adipic and pimelic acids this reaction occurs smoothly, with esters of the suberic acid unsatisfactorily. From the azelaic acid ester upwardly the formation of rings comprising 8 or still more links cannot be carried through at all (see W. Dickmann's article on page 27, vol. 317 of "Annalen der Chemie").

I have now found that nitriles having the formula—

$$N\equiv C-(CH_2)_n-C\equiv N$$

can be condensed to form cyclic α-cyanoketimides having the formula—

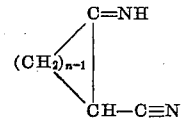

by acting thereon with a condensing agent of the type

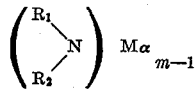

wherein $R_1$ and $R_2$ may be alkyl, aralkyl, aryl or an alicyclic radical, while M may be an alkali metal, for instance lithium or sodium, an alkaline earth metal, for instance magnesium, or a metal of the group constituted by aluminium and those metals, the oxides of which are designated as "rare earths", this group being as a rule cited as the earth metal group, $m$ being the valence of this metal, while X is halogen or the radical

At the same time two molecules will combine to form imino-acid nitriles having the formula—

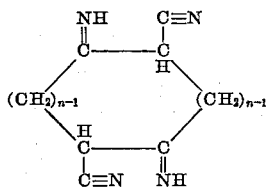

In the case of cyclic systems comprising 5 or 6 links the reaction occurs smoothly without any particular degree of dilution being required. When preparing cyclic compounds containing more than 6 links it has been found preferable to operate with a high degree of dilution. Operation in low concentration has proved quite particularly important when producing cyclic systems composed of more than 7 links.

By saponification according to well known methods the cyclic α-cyanoketimides can be converted into α-cyanoketones.

The products obtainable according to this invention have been found to be of value in the production of scents and other organic preparations.

In the operation of my invention I may for instance proceed as follows:

Example 1

108 grams adipic acid dinitrile are dissolved in 500 ccms. absolute ether and the solution is cooled down to a temperature between 0° and 20° C. below zero, whereupon a quantity corresponding to 1 molecule bromomagnesium diethylamide, dissolved in ether, is allowed to drop in under stirring. The bromomagnesium diethylamide can easily be prepared by cautiously adding to a solution of magnesium bromoethylate—

the equivalent quantity of diethylamine and boiling the mixture until the development of ethane has come to an end. From the reaction mixture the bromomagnesium compound of α-cyanocyclopentanon imide separates out. After stirring some time at room temperature the product is decomposed with an iced ammonium chloride solution. After evaporation of the ether the α-cyanocyclopentanon imide already described by Thorpe in Journal of the Chemical Society, vol. 95, 1903, melting at 147° C. is obtained as crystalline residue.

Example 2

An ethereal solution of lithium dicyclohexylamide is first prepared by causing pure dry dicyclohexylamine to drip into an ethereal solution of lithiumbutyl. The solution thus prepared is run under stirring into a cooled ethereal solution of the equivalent quantity of suberic acid dinitrile, a white precipitate settling down in the solution which is now poured into cold sulphuric acid of about 20%. Between the watery sulphuric acid solution and the ethereal layer is separated out a considerable quantity of a high molecular condensation product which is allowed to go to waste. In order to remove the dicyclohexylamine and to effect hydrolytic decomposition of the α-cyanocycloheptanon imide the ethereal solution is shaken some time with dilute sulphuric acid and thereafter washed with water. On evaporation of the ether there remains over the α-cyanocycloheptanon boiling (under a pressure of 12 mms. mercury column) at 140 to 141° C., the yield being about 15 to 20% of the calculated yield. In order to exactly characterize this substance I converted it into the semicarbazone which was found to melt at 162° C.

*Example 3*

Far higher yields than those obtainable according to the preceding example were obtained in the following manner: a flask provided with several tubulations carrying a stirrer and two burettes is filled with about 250 ccms. absolute ether, the burettes with ethereal solutions of equal strength, one containing one mole of lithium diethylamide or lithium dicyclohexylamide the other one mole suberic acid dinitrile, respectively. The ether is cooled down to a temperature between 0° and 20° C. below zero and the stirrer is set operating, whereupon 1 ccm. of the nitrile solution and directly thereafter 1 ccm. of the solution of the condensing agent is run in, these operations being repeated every two minutes. In proportion as the quantity of liquid in the flask increases, the speed of adding the solutions may be increased. The two solutions may also be run in continuously if care is taken to constantly keep the quantities of the two reagents equivalent. On operating further as described with reference to Example 2 one obtains about 70 to 80% of the theoretical yield of the α-cyanocycloheptanon.

*Example 4*

30 parts by weight of an 80% sodium hydrid or 39 parts finely powdered sodium amide are reacted at 120 to 130° C. under stirring with 500 parts absolutely dry methylaniline. Into the solution or suspension of the sodium methylaniline in methylaniline, after it has cooled down to 50 to 70° C., a solution of 136 parts suberic acid nitrile in 500 parts methylaniline is introduced very slowly. The mixture is then poured into a sufficient quantity of sulfuric acid of 20 to 30%, taken up with ether and the ether is freed from methylaniline by repeated shaking with mineral acids. Further treatment is effected in accordance with Example 2 and the yield is similar to the yield obtainable in accordance with that example.

*Example 5*

The quantity of lithium butyl corresponding to 0.4 mole is dissolved below nitrogen in 1000 ccms. absolute ether freed from air and 0.8 mole freshly distilled ethylaniline are added. Under a rapid rise of temperature a clear solution of the lithium ethylaniline is formed, which is heated to boiling under the reflux condenser. Under very vigorous stirring a solution of 30 grams (equal to 0.2 mole) azelaic acid dinitrile in 500 ccms. absolute ether are run in an absolutely continuous manner into the solution through the condenser at the rate of 3 to 4 ccms. per hour. When the whole of the nitrile has been introduced, the reaction mixture is poured into a mixture of ice and hydrochloric acid of 20% in excess of the calculated quantity. The ether is distilled off direct from the hydrochloric acid and the residue is boiled vigorously with the acid during a quarter of an hour under repeated shaking. The reaction product now floats on the watery layer as a highly viscous resinous oil. It is separated and triturated repeatedly with ether. The α-cyanocyclo-octanon thus formed is extracted by dissolving from the other byproducts. After removal of the ether by distillation the α-cyanocyclo-octanon remains over as a thick oil which, under a pressure of 15 mms. mercury column, boils at 150 to 160° C. The distillate soon solidifies. After recrystallization from benzene and petrol ether it melts at 55° C. The yield is 10 grams equal to 30% of the theoretical yield.

By boiling with sulphuric acid of 60 to 70% the substance is converted into the well known cyclo-octanon.

The residue from the extraction with ether, on being allowed to stand some time, yields crystals which can be separated from the resin admixed to them by trituration with ethyl acetate, in which they dissolve only with difficulty. There are obtained about 4.5 grams of the 2,9-dicyanocyclohexadecan-1,8-dion, as is proven by the fact that by boiling with sulphuric acid of 70% the substance can be converted under saponification and separation of the cyano groups into the cyclohexadecandion described by Ruzicka (Helvetica Chimica Acta, vol. 11, pp. 501–502), which melts at 87° C.

*Example 6*

In the operation described with reference to Example 5 the azelaic acid dinitrile is replaced by 50 grams 1,14-dicyanotetradecan. When the reaction has come to an end, the reaction mixture is poured into an excess of hydrochloric acid mixed with ice, the ethereal layer is quickly separated from the acid and from the resinous condensation products which have separated out, the ethylaniline is removed by repeatedly shaking for a short time with a cooled 10% hydrochloric acid, and the product is finally washed with water. The etheric layer is shaken some time with calcium chloride and thereafter concentrated. After some time there crystallizes out the product having the formula—

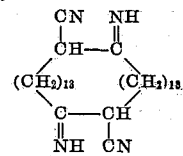

After recrystallization it forms colorless crystals melting at 192° C. By several hours' boiling with sulphuric acid of 70% it can be converted into the diketone, described by Ruzicka in Helvetica Chimica Acta, vol. 13, p. 1152, comprising a ring of 30 C-atoms.

The ethereal filtrate obtained in the production of the above product is evaporated completely and then subjected to distillation in a high vacuum. The fraction which under a pressure of 0.1 to 0.3 mms. mercury column boils at 150 to 180° C., solidifies and can easily be reduced to a melting point of 135° C. by recrystallization from benzine (gasoline). One thus obtains the 2-cyano-cyclopentadecanon-(1)-imide, as can be proven by boiling the product during two hours under the reflux condenser with a 70% sulphuric acid, diluting with water and taking up with ether. The ethereal solution is washed with caustic soda solution, dried above calcium chloride and concentrated by evaporation. The residue boils, under a pressure of 0.1 to 0.2 mms. mercury column, at 115 to 120° C. The distillate becomes altogether solid and melts, without being further purified, at 63° C., which is the correct melting point of the cyclopentadecanon.

Various changes may be made in the details disclosed in the foregoing specification without departing from the invention or sacrificing the advantages thereof.

I claim:—

1. The method of producing cyclic alpha-cyanoketone compounds comprising acting on a nitrile having the formula—

with a condensing agent of the type—

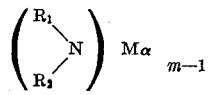

wherein R₁ and R₂ are members of the group consisting of alkyl, aralkyl, aryl, and alicyclic radicals, while M is a metal of the group constituted by the alkali, alkaline earth and earth metals and $m$ denotes the valence of this metal $n$ being 4 or a higher integer, while X is halogen or the radical—

2. The method of producing cyclic alpha-cyanoketone compounds comprising acting on a nitrile having the formula—

with a condensing agent of the type—

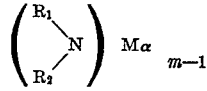

wherein R₁ and R₂ are members of the group consisting of alkyl, aralkyl, aryl, and alicyclic radicals, while M is a metal of the group constituted by the alkali, alkaline earth and earth metals, and $m$ denotes the valence of this metal, $n$ being 4 or a higher integer, while X is halogen or the radical—

and subjecting the alpha-cyanoketimide thus formed to saponification to change the imido group into a keto group.

3. The method claimed in claim 1, in which condensation is carried through in a state of high dilution.

4. The method claimed in claim 2, in which condensation is carried through in a state of high dilution.

5. The alpha-cyanocycloheptanon, which, under a pressure of 12 mms. mercury column, boils at 140 to 141° C., its semicarbazone melting at 162° C.

6. The alpha-cyanocyclo-octanon, being a thick oil boiling, under a pressure of 15 mms. mercury pressure, at 150 to 160° C. and forming crystals melting, on recrystallization from benzene and petrol ether, at 55° C.

7. The 2-cyanocyclopentadecanon imide melting, on recrystallization from benzine (gasoline) at 135° C.

8. The cyclic alpha cyanoketone compounds corresponding to the formula—

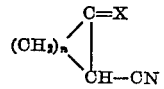

wherein X is =O or the =NH group, while $n$ is 5 or a higher integer.

KARL ZIEGLER.